US008990129B1

(12) United States Patent
Rowe

(10) Patent No.: US 8,990,129 B1
(45) Date of Patent: Mar. 24, 2015

(54) REQUESTING A RE-PROMPT BASED ON LEARNED BEHAVIOR

(71) Applicant: Google Inc., Mountain View, CA (US)

(72) Inventor: Simon Michael Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/780,443

(22) Filed: Feb. 28, 2013

(51) Int. Cl.
G06N 99/00 (2010.01)
G06Q 30/06 (2012.01)
G06Q 30/00 (2012.01)

(52) U.S. Cl.
CPC .......... G06N 99/005 (2013.01); G06Q 30/0607 (2013.01); G06Q 30/00 (2013.01)
USPC .............................. 706/12; 706/45

(58) Field of Classification Search
None
See application file for complete search history.

(56) References Cited

U.S. PATENT DOCUMENTS 8,037,042 B2 10/2011 Anderson et al.
2002/0112048 A1 8/2002 Gruyer et al.
2010/0042387 A1 2/2010 Gibbon et al.
2010/0169176 A1 7/2010 Turakhia
2012/0016836 A1 1/2012 Fender et al.

OTHER PUBLICATIONS

Knuff, Has the development of online newspaper components positively or negatively impacted newspaper print sales?, Thesis, College of the Holy Cross, 2011, pp. 1-18.*

* cited by examiner

Primary Examiner — Wilbert L Starks
(74) Attorney, Agent, or Firm — John D. Lanza; Foley & Lardner LLP

(57) ABSTRACT

A system for determining to request a re-prompt for a metering device, includes: a data store including a computer readable medium storing a program of instructions for determining to request the re-prompt; a processor that executes the program of instructions; a registration module to register a media consumer associated with the metering device; a behavior learning unit to learn a behavior associated with the registered media consumer; a behavior determination unit to determine a difference between the behavior associated with the registered media consumer and a behavior associated with a present media consumer; and a re-prompt determination unit to request the re-prompt to the metering device based on the difference being greater than a predetermined threshold.

20 Claims, 3 Drawing Sheets

REQUESTING A RE-PROMPT BASED ON LEARNED BEHAVIOR

BACKGROUND

A measurement system monitors media consumption habits by a media consumer. Thus, by being cognizant of the media consumption habits, a content provider may effectively determine prices for advertisements, or determine whether certain content displayed or presented at a specific time is effective. Media consumption may refer to viewing a program, listening to an audio program, reading a web site, for example.

The measurement system may be implemented at a single source, such as a television located in at a location or a personal computer. Thus, the measurement system may be equipped with an authentication system that avails a registration for the various personnel associated with the location. The various personnel may register themselves as the media consumer presently associated with the single source.

The process of registration may become burdensome. Because the measurement system requires each media consumer to register themselves, the media consumer may find this process to be inconvenient. Thus, media consumers may piggy-back on a previous media consumer's registration. This leads to inaccuracies in the measurement system's ability to correctly attribute the media being consumed to the correct media consumer.

Thus, the measurement system may be equipped with an automatic authentication prompt (re-prompt). By periodically requesting that the media consumer provide an authentication response or identity, the measurement system may be able to ensure a more accurate measurement.

However, if the periodic requesting occurs too infrequently, the accuracy of the measurement may be lessened. This is due to the chances of the correct media consumer being registered by the measurement system being decreased. If the periodic requesting occurs too frequently, the media consumer may be perturbed by the number of requests to provide authentication.

SUMMARY

A system for determining to request a re-prompt for a metering device, includes a data store including a computer readable medium storing a program of instructions for determining to request the re-prompt; a processor that executes the program of instructions; a registration module to register a media consumer associated with the metering device; a behavior learning unit to learn a behavior associated with the registered media consumer; a behavior determination unit to determine a difference between the behavior associated with the registered media consumer and a behavior associated with a present media consumer; and a re-prompt determination unit to request the re-prompt to the metering device based on the difference being greater than a predetermined threshold.

DESCRIPTION OF THE DRAWINGS

The detailed description refers to the following drawings, in which like numerals refer to like items, and in which.

DETAILED DESCRIPTION

Figure 1:
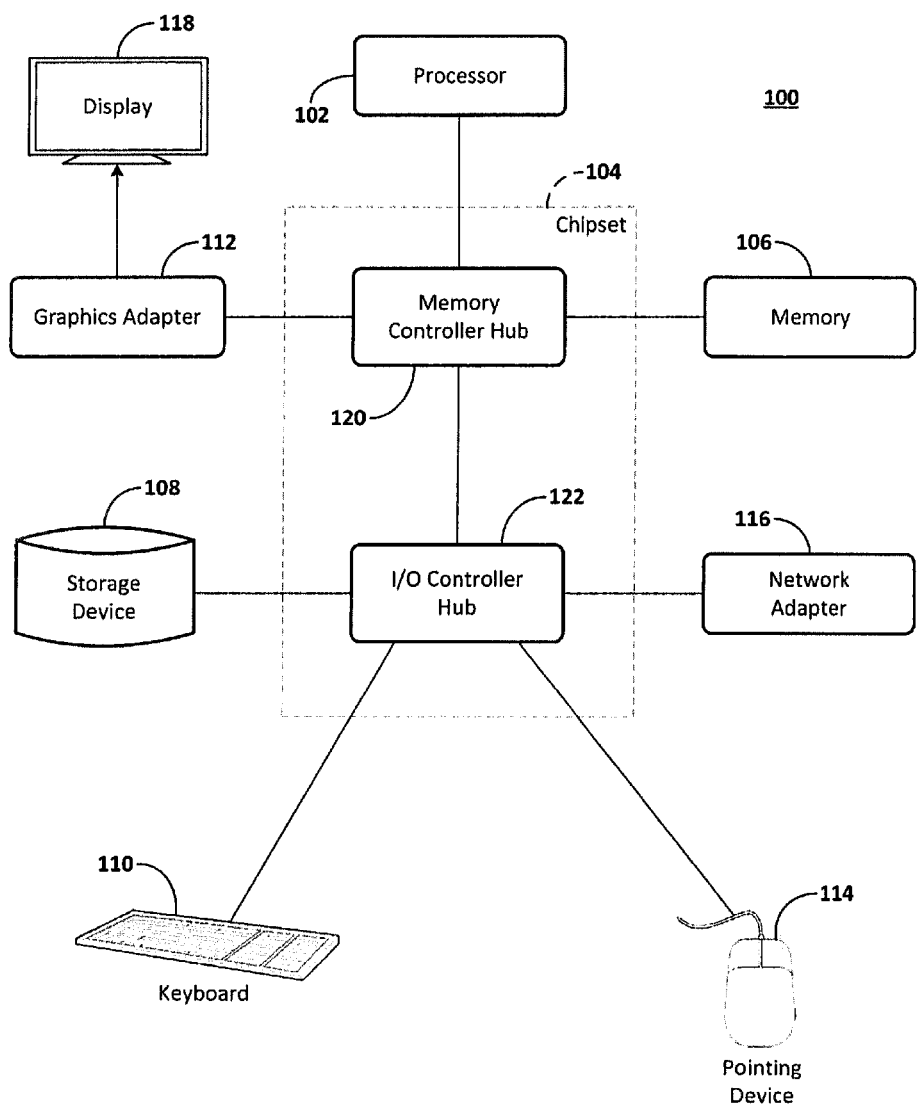
FIG. 1 is a block diagram illustrating an example computer.

With respect to known techniques for monitoring media consumption habits, several issues exist preventing or limiting an accurate data measurement. Also, various inconveniences to users exist, thereby preventing an easy and seamless experience.

For example, a web meter may be employed to monitor a user's activities and web browsing habits. The web meter may be able to correlate the web browsing with a specific user. In order to accomplish this, the user registers with the web meter through a user registration technique, such as responding to a sign-on prompt.

In order to ensure that the user who registered is the user currently browsing the web, the web meter may re-prompt the user periodically. However, if the re-prompting occurs too infrequently, an accurate detection of the user may not occur. If the user is re-prompted too frequently, the user may be frustrated and annoyed.

Disclosed herein are techniques for a determination to re-prompt based on the detection of behavior changes associated with how the user consumes media. The techniques employed herein record and determine a behavior associated with a specific user, and based on a detection of the behavior changing, determining if a re-prompt is delivered to the specific user.

When another user uses a web browser, the behavior of how the other user uses the browser may be distinct from the previous user. For example, different users may spend different time amounts on a search result page. One user may scroll through and view every link carefully. Another user may rapidly click-through the first link provided. Thus, based on different behaviors associated with the user, the techniques disclosed herein may generate a re-prompting.

The aspects disclosed herein may be employed with a television metering device as well. Thus, based on a first viewer's interaction with a television, the aspects disclosed herein may detect that a second viewer is now the present viewer of the television. For example, the first viewer may be associated with a specific speed of channel changing, a specific television programming, and the like.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
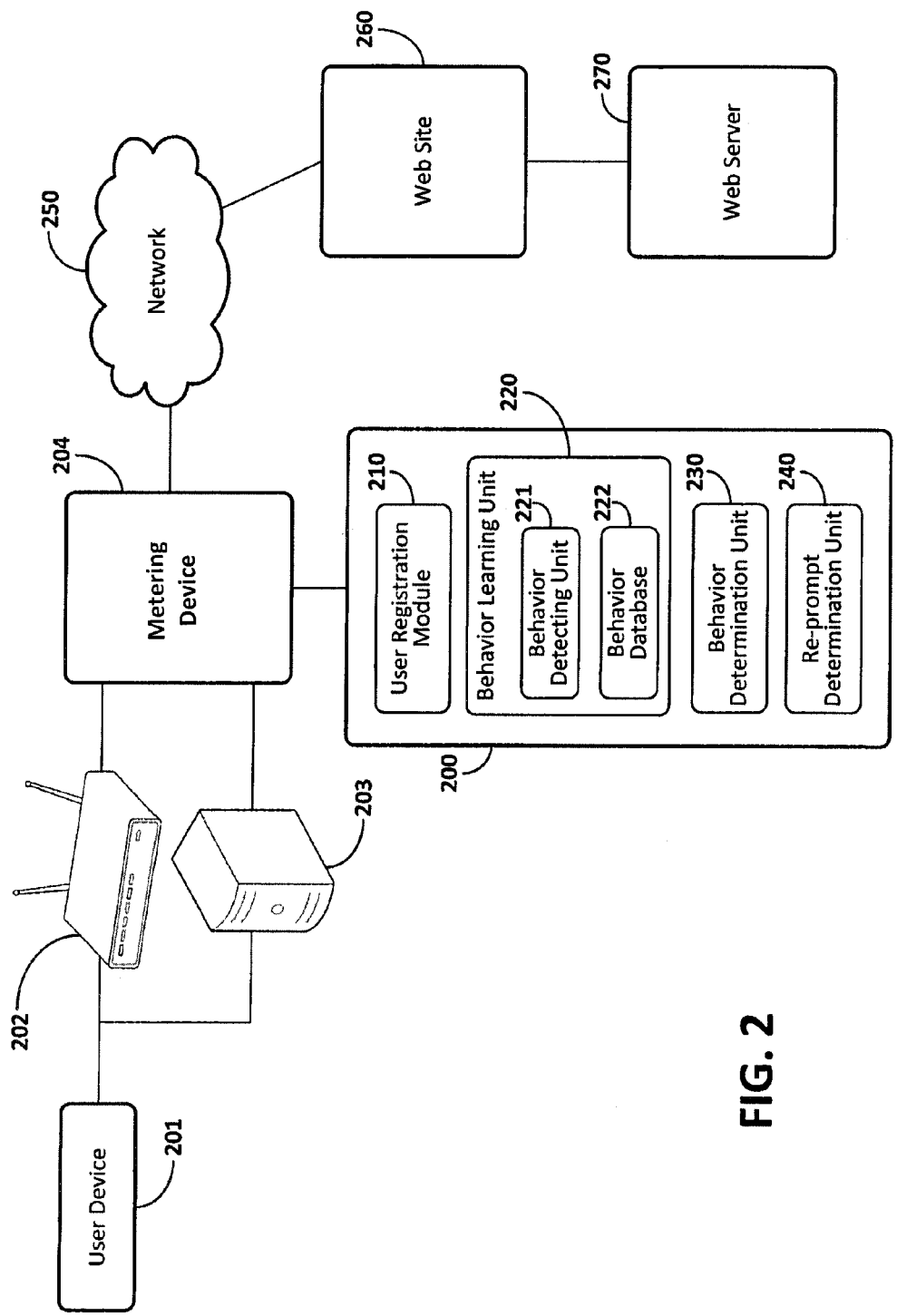
FIG. 2 illustrates an example of a system for requesting a re-prompt based on learned behavior.

FIG. 2 illustrates an example of a system for requesting a re-prompt based on learned behavior. The system 200 includes a user registration module 210, a behavior learning unit 220, a behavior determination unit 230, and a re-prompt determination unit 240. The system 200 may be implemented on a device such as computer 100. The system 200 is incorporated as part of metering device 204. The metering device 204 may be any sort of media monitoring system that logs access to media consumption in association with a registered user.

A user device 201, which may be implemented on a device such as computer 100, communicates with a router 202 or computer server 203 to access a network 250. The network 250 provides access to content, such as web site 260 which is stored on a server 270. The metering device 204 may be implemented as part of or in communication with the router 202 or the computer server 203. Alternatively, the metering device 204 may be implemented as part of user device 201.

The user registration module 210 registers the user associated with the user device 201. The user registration module 210 may be provided the identity of the user via the user device 201, or may instigate an authentication process to prompt the user of user device 201 to provide information associated with the user's identity. Once the user's identity is ascertained, the metering device 204 may log data associated with the user's media consumption.

The behavior learning unit 220 learns the behavior associated with the present user registered by the user registration module 210. The behavior learning unit 220 includes a behavior detector unit 221 and a behavior learned database 222.

The behavior detector unit 221 detects a behavior associated with the registered users actions. For example, if the registered user averages a specific time amount while viewing a web site, the behavior detector unit 221 may detect the specific time amount as a behavior.

Other actions and patterns by the registered user may be detected as a distinct behavior. For example, the registered user may scroll through the complete page associated with search results. Another user may not. Additionally, the amount of time to read a page (or the average amount of time to read a page) may also be recorded as a behavior.

Additionally, the scope and nature of a media being viewed might be associated as a behavior. If a majority of the media that the registered user consumes is directed towards fashion, the registered user may be associated with a behavior of viewing content that is fashion related.

Behavior learning may be limited to a predetermined time after the user registers, thereby ensuring the behavior being learned is the registered users and not a subsequent user of the registered user's device.

The behavior learned database 222 stores the detected behaviors of the registered user presently being monitored by the metering device 204. The behavior learned database 222 may store the data in the form of a lookup table accessed by other elements of system 200.

The behavior determination unit 230 determines if the present actions associated with accessing and consuming media correspond to the recorded behavior stored in the behavior learned database 222 for the present registered user.

The behavior determination unit 230 monitors the actions made by the present user of user device 201. Based on behaviors associated with the present user 201, the behavior determination unit 230 may determine if the behavior is within a predetermined range or difference from the behaviors stored in the behavior learned database 222 for the present registered user. For example, if the present user of user device 201 starts scrolling all the retrieved sites for a search result, and the behavior learned database 222 indicates the present registered user mostly clicks on a link in the first screen associated with the search result, the behavior determination unit 230 may indicate that there is a behavior change between the present registered user versus the present user of user device 201.

The re-prompt determination unit 240 may request that the metering device 204 transmit a re-prompt to verify the identity of the present user of user device 201 based in part on the determination made by the behavior determination unit 230. For example, if the behavior determination unit 230 determines that the behavior of the present user of user device 201 has changed based on previously learned knowledge, the re-prompt determination unit 240 may initiate a re-prompting. The re-prompting may be executed by the metering device 204 by requesting the user of user device 201 identify themselves.

The re-prompt determination unit 240 may use the above analysis along with a predetermined time interval to request a re-prompting. Thus, for every predetermined time interval, the re-prompt determination 240 may request a re-prompting based in part on the determination made by the behavior determination unit 230.

Figure 3:
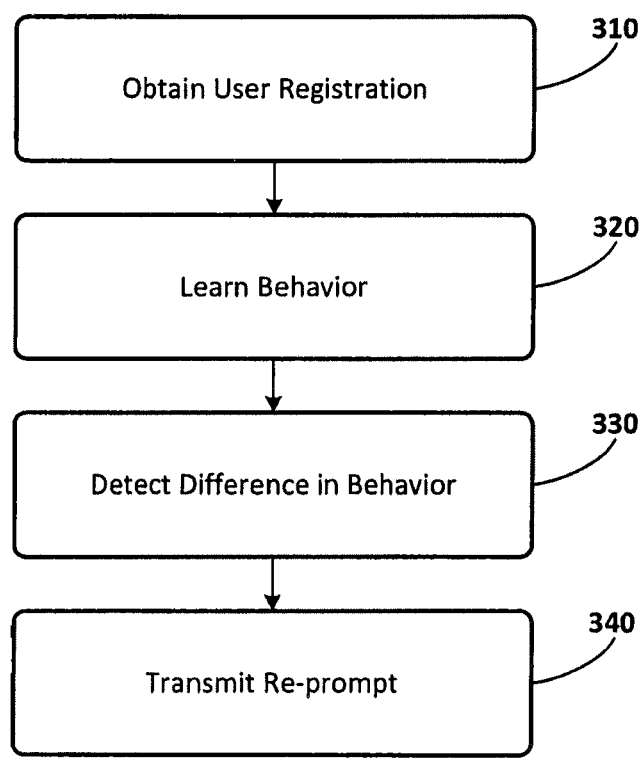
FIG. 3 illustrates an example of a method for requesting a re-prompt based on learned behavior.

FIG. 3 illustrates an example of a method 300 for requesting a re-prompt based on learned behavior. The method 300 may be implemented on the system 200 depicted in FIG. 2.

In operation 310, a user registration is requested or provided. If the user registration is requested, a user associated with a user device 201 may be prompted for identification. Alternatively, the user registration may be provided through an automatic identification or another known technique.

In operation 320, a behavior associated with the registered user is learned and stored for future recall. Additionally, behavior associated with the registered user may also be previously stored on a database associated with a system implementing method 300.

The behavior associated with the registered users is detected and learned. For example, if the registered user averages a specific time amount while viewing a web site, this action may be detected as a behavior.

Other actions and patterns by the registered user may be detected as a distinct behavior as well. For example, the registered user may scroll through the complete page associated with search results. Another user may not. Thus, in operation 320, the behavior of how the registered user interacts with a search result page may be recorded. Additionally, the amount of time to read a page (or the average amount of time to read a page) may also be recorded as a behavior.

Additionally, the scope and nature of a media being viewed might be viewed as a behavior. If a majority of the media that the register user consumes is directed towards fashion, the registered user may be associated with a behavior of viewing content related to fashion. Conversely, if another user mostly views content associated with sports, that user may be associated with a behavior of preferring content associated with sports.

The monitoring and learning of behavior may be limited to a predetermined time after the user registers, thereby ensuring the behavior being learned is the registered users and not a subsequent user of the registered user's device.

In operation 330, a determination is made as to whether a present user's behavior differs from the behavior associated with the registered user's behavior. This determination is made by comparing if the present actions associated with accessing and consuming media by a present user corresponds to learned behavior generated in operation 320 for the most recent registered user.

This determination is performed by monitoring the actions made by the present user. Based on behavior associated with the present user, a determination may be made if the behavior associated with the present user is within a predetermined range or difference from the behaviors associated with the registered user. For example, if the present user starts scrolling all the retrieved sites for a search result, and the learned behavior indicates that the most recent registered user clicks on a link in the first screen associated with the search result, in operation 330 a determination may be made that there is a behavior change between the present user versus the most recently registered user.

In operation 340, a determination is made as to generate a re-prompt for the user registration. The determination in operation 340 may be made contingent on the determination made in operation 330, if a behavior change was noted. The determination in operation 340 may also be made contingent on a predetermined interval set up to re-prompt for the user registration. Thus, if the predetermined interval has elapsed, and the determination in operation 330 is affirmative, a determination to generate a re-prompt for the user registration may be indicated to a media monitoring system, or device employing method 300. Thus, the media monitoring system or the device may request that a user being monitored re-register or provide information about the user's identity.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system for determining to request a re-prompt for a metering device, comprising:
    a data store comprising a computer readable medium storing a program of instructions for determining to request the re-prompt;
    a processor that executes the program of instructions;
    a registration module to register a media consumer associated with the metering device;
    a behavior learning unit to learn a behavior associated with the registered media consumer;
    a behavior determination unit to determine a difference between the behavior associated with the registered media consumer and a behavior associated with a present media consumer; and
    a re-prompt determination unit to request the re-prompt to the metering device based on the difference being greater than a predetermined threshold.

2. The system according to claim 1, wherein the re-prompt determination unit requests the re-prompt to the metering device based on the difference being greater than a predetermined threshold and after a predetermined time interval.

3. The system according to claim 1, wherein the metering device is a web meter.

4. The system according to claim 3, wherein the learned behavior is an average amount of time associated with the registered media consumer's access of a web site.

5. The system according to claim 3, wherein the learned behavior is a scope associated with the registered media consumer's web browsing activities.

6. The system according to claim 1, wherein the behavior learning unit learns for a predetermined time.

7. The system according to claim 6, wherein the behavior determination unit determines the difference after the predetermined time.

8. A method for determining to request a re-prompt for a metering device, comprising:
    receiving, by a processor, a registration of a media consumer for a device implemented with the metering device;
    learning, by the processor, a behavior associated with the registered media consumer;
    determining, by the processor, a difference between the registered media consumer's behavior and a present media consumer's behavior; and
    in response to the difference being greater than a predetermined threshold, requesting by the processor, the re-prompt to be transmitted to the metering device.

9. The method according to claim 8, wherein the requesting of the re-prompt to be transmitted is further based on a predetermined time interval elapsing.

10. The method according to claim 8, wherein the metering device is a web meter.

11. The method according to claim 10, wherein the learned behavior is an average amount of time associated with the registered media consumer accessing of a web site.

12. The method according to claim 8, wherein the learning of behavior occurs for a predetermined time.

13. The method according to claim 12, wherein the determination of the difference occurs after the predetermined time.

14. A system for learning behavior associated with a media consumer interaction with a metered device, comprising:
    a data store comprising a computer readable medium storing a program of instructions for the learning of the behavior;
    a processor that executes the program of instructions;
    a behavior detector unit to detect the behavior of the registered media consumer usage of the metered device;
    a behavior database to store the detected behavior of the registered media consumer; and
    a behavior determination unit to detect a difference between the stored behavior of the registered media consumer and a present media consumer.

15. The system according to claim 14, wherein the metering device is a web meter.

16. The system according to claim 15, wherein the learned behavior is an average amount of time associated with the registered media consumer accessing a web site via the metered device.

17. The system according to claim 15, wherein the learned behavior is a scope associated with the registered media consumers web browsing activities via the metered device.

18. The system according to claim 14, wherein the behavior detector unit detects the behavior for a predetermined time.

19. The method according to claim 18, wherein the learned behavior is a scope associated with the registered media consumers web browsing activities.

20. The system according to claim 18, wherein the behavior determination unit detects the difference after a predetermined time.

\* \* \* \* \*